United States Patent
Peters et al.

(10) Patent No.: US 12,531,435 B2
(45) Date of Patent: Jan. 20, 2026

(54) WIRELESS CHARGER MOUNTING SYSTEM

(71) Applicant: ANNEX PRODUCTS PTY. LTD., South Yarra (AU)

(72) Inventors: Christopher L. Peters, South Yarra (AU); Marco Sebastiani, South Yarra (AU)

(73) Assignee: Annex Products Pty. Ltd., South Yarra (AU)

( * ) Notice: Subject to any disclaimer, the term of this patent is extended or adjusted under 35 U.S.C. 154(b) by 722 days.

(21) Appl. No.: 17/859,512

(22) Filed: Jul. 7, 2022

(65) Prior Publication Data

US 2023/0198301 A1  Jun. 22, 2023

Related U.S. Application Data

(60) Provisional application No. 63/290,799, filed on Dec. 17, 2021.

(51) Int. Cl.
*H02J 7/00* (2006.01)
*A45C 11/00* (2006.01)
(Continued)

(52) U.S. Cl.
CPC ............ *H02J 50/005* (2020.01); *A45C 11/00* (2013.01); *H02J 7/0042* (2013.01);
(Continued)

(58) Field of Classification Search
USPC .................. 320/106, 107, 108, 109, 110, 112
See application file for complete search history.

(56) References Cited

U.S. PATENT DOCUMENTS

| 2,797,655 A | 7/1957 | Morehouse |
|---|---|---|
| 3,013,688 A | 12/1961 | Luning |

(Continued)

FOREIGN PATENT DOCUMENTS

| CN | 2678269 Y | 2/2005 |
|---|---|---|
| CN | 102096451 | 6/2011 |

(Continued)

OTHER PUBLICATIONS

Ghostek, "Detachable Wallet—iPhone 13," accessed on the Internet at: https://ghostek.com/collections/exec/products/exec-iphone-13-wallet-case (believed to be publicly available before Jun. 28, 2022).

(Continued)

*Primary Examiner* — Brian Ngo
(74) *Attorney, Agent, or Firm* — Sterne, Kessler, Goldstein & Fox P.L.L.C.

(57) ABSTRACT

A system for mounting a wireless cellphone charger to a cellphone, including a cellphone case and a wireless cellphone charger mount. The cellphone case defines a bore and a recess disposed adjacent the bore and includes a shell and a first retention ring having a first metal plate receivable by the recess to secure the first retention ring to the shell. The wireless cellphone charger mount has a wireless cellphone charger, a second metal plate and an interface comprising a protrusion receivable by the bore. The wireless cellphone charger is securable to the cellphone case when the first retention ring is secured to the shell by aligning the protrusion and the bore and magnetically coupling the first and second metal plates.

17 Claims, 7 Drawing Sheets

(51) Int. Cl.
*H02J 50/00* (2016.01)
*H04B 1/3883* (2015.01)
*H04B 1/3888* (2015.01)
*H04M 1/02* (2006.01)
*H04M 1/04* (2006.01)
*H04M 1/21* (2006.01)

(52) U.S. Cl.
CPC ......... *H04B 1/3883* (2013.01); *H04B 1/3888* (2013.01); *H04M 1/0274* (2013.01); *H04M 1/04* (2013.01); *H04M 1/21* (2013.01); *A45C 11/002* (2025.01)

(56) References Cited

U.S. PATENT DOCUMENTS

| | | | |
|---|---|---|---|
| 3,041,697 A | 7/1962 | Budreck | |
| 3,521,216 A | 7/1970 | Tolegian | |
| 3,642,122 A | 2/1972 | Von Ende | |
| 3,741,376 A | 6/1973 | Brown et al. | |
| 3,808,577 A | 4/1974 | Mathhauser | |
| 4,319,097 A | 3/1982 | Liautaud | |
| 4,480,361 A | 11/1984 | Morita | |
| 4,982,581 A | 1/1991 | Furuyama | |
| 4,991,270 A | 2/1991 | Aoki | |
| 5,025,966 A | 6/1991 | Potter | |
| 5,367,891 A | 11/1994 | Furuyama | |
| 5,377,392 A | 1/1995 | Morita | |
| 5,550,452 A | 8/1996 | Shirai et al. | |
| 5,572,887 A | 11/1996 | Geswelli | |
| 5,577,696 A | 11/1996 | Kramer | |
| 5,708,874 A | 1/1998 | Schrock et al. | |
| 5,920,966 A | 7/1999 | Chen | |
| 5,933,926 A | 8/1999 | Reiter | |
| 5,983,464 A | 11/1999 | Bauer | |
| 5,992,807 A | 11/1999 | Tarulli | |
| 6,009,601 A | 1/2000 | Kaufman | |
| 6,131,247 A | 10/2000 | Morita | |
| 6,135,408 A | 10/2000 | Richter | |
| 6,149,116 A | 11/2000 | Wor | |
| 6,170,131 B1 | 1/2001 | Shin | |
| 6,215,381 B1 | 4/2001 | Aoki | |
| 6,295,702 B1 | 10/2001 | Bauer | |
| 6,305,656 B1 | 10/2001 | Wemyss | |
| 6,434,801 B2 | 8/2002 | Grunberger | |
| 6,502,727 B1 | 1/2003 | Decoteau | |
| 6,564,434 B1 | 5/2003 | Morita | |
| 6,640,398 B2 | 11/2003 | Hoffman | |
| 6,644,617 B2 | 11/2003 | Pitlor | |
| 6,821,126 B2 | 11/2004 | Neidlein | |
| 6,888,940 B1 | 5/2005 | Deppen | |
| 6,919,787 B1 | 7/2005 | Macken | |
| 6,981,391 B2 | 1/2006 | Suzuki | |
| 7,431,251 B2 | 10/2008 | Carnevali | |
| 7,523,527 B2 | 4/2009 | Garber | |
| 7,683,572 B2 | 3/2010 | Toya | |
| 7,735,644 B2 | 6/2010 | Sirichai et al. | |
| 7,755,666 B2 | 7/2010 | Noji | |
| 7,762,817 B2 | 7/2010 | Ligtenberg et al. | |
| 7,837,160 B2 | 11/2010 | Huang | |
| 7,956,712 B2 | 6/2011 | Fullerton et al. | |
| 8,169,185 B2 | 5/2012 | Partovi et al. | |
| 8,238,086 B2 | 8/2012 | Ou | |
| 8,269,595 B2 | 9/2012 | Okada et al. | |
| 8,344,836 B2 | 1/2013 | Lauder et al. | |
| 8,362,667 B2 | 1/2013 | Jin et al. | |
| 8,376,292 B2 | 2/2013 | Cicco | |
| 8,430,434 B2 | 4/2013 | Fiedler | |
| 8,509,865 B1 | 8/2013 | LaColla et al. | |
| 8,553,408 B2 | 10/2013 | Supran et al. | |
| 8,567,744 B1 | 10/2013 | Marn et al. | |
| 8,688,037 B2 | 4/2014 | Chatterjee et al. | |
| 8,695,934 B2 | 4/2014 | Jensen | |
| 8,706,175 B2 | 4/2014 | Cho | |
| 8,718,731 B1 | 5/2014 | Tang | |
| 8,727,290 B1 | 5/2014 | De La Matta et al. | |
| 8,794,682 B2 | 8/2014 | Fiedler | |
| 8,823,477 B2 | 9/2014 | Malanczyj et al. | |
| 8,915,361 B2 | 12/2014 | Rayner | |
| 8,931,745 B2 | 1/2015 | Ng | |
| 8,936,222 B1 | 1/2015 | Bastian et al. | |
| 9,019,698 B2 | 4/2015 | Thiers | |
| 9,112,363 B2 | 8/2015 | Partovi | |
| 9,197,726 B2 | 11/2015 | Stanimirovic et al. | |
| 9,243,739 B2 | 1/2016 | Peters | |
| 9,367,090 B2 | 6/2016 | Barnett et al. | |
| 9,397,719 B1 | 7/2016 | Schmidt | |
| 9,602,646 B2 | 3/2017 | Stanimirovic et al. | |
| 9,689,527 B2 | 6/2017 | Franklin | |
| 9,706,829 B2 | 7/2017 | Tilney | |
| 9,743,745 B2 | 8/2017 | Duddy | |
| 9,800,283 B2 | 10/2017 | Schmidt | |
| 9,804,636 B2 | 10/2017 | Barnett et al. | |
| 9,814,289 B2 | 11/2017 | Lay et al. | |
| 9,848,071 B2 | 12/2017 | Thiers | |
| 9,913,388 B1 | 3/2018 | Mchatet | |
| 9,980,543 B2 | 5/2018 | Ma et al. | |
| 10,003,372 B2 | 6/2018 | Stanimirovic et al. | |
| 10,019,034 B2 | 7/2018 | Barnett et al. | |
| 10,040,405 B2 | 8/2018 | Liao | |
| 10,078,346 B2 | 9/2018 | Lay et al. | |
| 10,192,665 B2 | 1/2019 | Breiwa et al. | |
| 10,200,518 B2 | 2/2019 | Richter | |
| 10,363,884 B2 | 7/2019 | Chen | |
| 10,396,575 B2 | 8/2019 | Stanimirovic et al. | |
| 10,404,089 B2 | 9/2019 | Kasar et al. | |
| 10,484,522 B1 | 11/2019 | McHatet | |
| 10,571,964 B2 | 2/2020 | Barnett et al. | |
| 10,583,790 B2 | 3/2020 | Wang | |
| 10,655,656 B2 | 5/2020 | Franklin | |
| 10,673,997 B2 | 6/2020 | Cantoli-Alves et al. | |
| 10,686,320 B2 | 6/2020 | Stanimirovic et al. | |
| 10,703,297 B1 | 7/2020 | Cohen et al. | |
| 10,764,417 B1 | 9/2020 | Malach | |
| 10,836,325 B1 | 11/2020 | Seko | |
| 10,855,092 B2 | 12/2020 | Stanimirovic et al. | |
| 10,988,197 B1 | 4/2021 | Hamilton et al. | |
| 11,034,309 B2 | 6/2021 | Chow | |
| 11,044,974 B2 | 6/2021 | Whitten et al. | |
| 11,201,481 B2 | 12/2021 | Lu | |
| 11,201,484 B2 | 12/2021 | Weber et al. | |
| 11,239,682 B2 | 2/2022 | Cakmak | |
| 11,265,035 B1 | 3/2022 | Zhang | |
| 11,277,504 B2 | 3/2022 | Cantoli-Alves et al. | |
| 11,394,244 B2 | 7/2022 | Parkin | |
| 11,548,451 B2 | 1/2023 | Jankura et al. | |
| 11,552,667 B2 | 1/2023 | Balderston | |
| 11,722,015 B2 | 8/2023 | Walton et al. | |
| 12,040,643 B2 | 7/2024 | Karanikos et al. | |
| 2002/0003874 A1 | 1/2002 | Peiker | |
| 2004/0079111 A1 | 4/2004 | Hartgrove | |
| 2004/0232291 A1 | 11/2004 | Carnevali | |
| 2005/0023841 A1 | 2/2005 | Chen | |
| 2005/0121579 A1 | 6/2005 | Rim et al. | |
| 2005/0283953 A1 | 12/2005 | Jeffrey | |
| 2006/0054647 A1 | 3/2006 | Kathrein et al. | |
| 2006/0086873 A1 | 4/2006 | Chen | |
| 2006/0091222 A1 | 5/2006 | Leung et al. | |
| 2006/0229740 A1 | 10/2006 | Kreisel et al. | |
| 2006/0230296 A1 | 10/2006 | Peterson et al. | |
| 2006/0237604 A1 | 10/2006 | Tan | |
| 2007/0090241 A1 | 4/2007 | Risse | |
| 2007/0099469 A1 | 5/2007 | Sorensen | |
| 2007/0120392 A1 | 5/2007 | Wolfinger | |
| 2007/0225031 A1 | 9/2007 | Bodkin et al. | |
| 2007/0286410 A1 | 12/2007 | Daly et al. | |
| 2008/0023508 A1 | 1/2008 | Harchol | |
| 2008/0047111 A1 | 2/2008 | Garber | |
| 2008/0110672 A1 | 5/2008 | Ryan | |
| 2008/0156833 A1 | 7/2008 | Espiritu et al. | |
| 2008/0271296 A1 | 11/2008 | Jepsen | |
| 2008/0302687 A1 | 12/2008 | Sirichai et al. | |
| 2010/0072334 A1 | 3/2010 | Le Gette et al. | |
| 2010/0131691 A1 | 5/2010 | Chatterjee et al. | |

(56) References Cited

U.S. PATENT DOCUMENTS

| | | |
|---|---|---|
| 2010/0225429 A1 | 9/2010 | Tsai |
| 2010/0317418 A1 | 12/2010 | Zanetti |
| 2011/0050164 A1 | 3/2011 | Partovi et al. |
| 2011/0064401 A1 | 3/2011 | Desorbo |
| 2011/0079619 A1 | 4/2011 | Lewis |
| 2011/0147424 A1 | 6/2011 | Brown et al. |
| 2011/0182007 A1 | 7/2011 | Zhu et al. |
| 2011/0192857 A1 | 8/2011 | Rothbaum et al. |
| 2011/0227527 A1 | 9/2011 | Zhu et al. |
| 2011/0255219 A1 | 10/2011 | Ou |
| 2011/0255226 A1 | 10/2011 | Duncan Seil et al. |
| 2011/0267748 A1 | 11/2011 | Lane et al. |
| 2011/0297566 A1 | 12/2011 | Gallagher et al. |
| 2011/0303578 A1 | 12/2011 | Mizell et al. |
| 2012/0024741 A1 | 2/2012 | Beatty et al. |
| 2012/0092377 A1 | 4/2012 | Stein |
| 2012/0104197 A1 | 5/2012 | Jensen |
| 2012/0112553 A1 | 5/2012 | Stoner et al. |
| 2012/0118770 A1 | 5/2012 | Valls et al. |
| 2012/0146576 A1 | 6/2012 | Partovi |
| 2012/0146752 A1 | 6/2012 | Fullerton et al. |
| 2012/0175474 A1 | 7/2012 | Barnard et al. |
| 2012/0206090 A1 | 8/2012 | Hyun-Jun et al. |
| 2012/0252543 A1 | 10/2012 | Cho |
| 2012/0329532 A1 | 12/2012 | Ko |
| 2013/0068915 A1 | 3/2013 | Yang |
| 2013/0078855 A1 | 3/2013 | Hornick et al. |
| 2013/0098788 A1 | 4/2013 | Mccarville et al. |
| 2013/0221189 A1 | 8/2013 | Kubin |
| 2013/0318775 A1 | 12/2013 | Peters |
| 2014/0028243 A1 | 1/2014 | Rayner |
| 2014/0049376 A1 | 2/2014 | Ng |
| 2014/0128132 A1 | 5/2014 | Cox, III |
| 2014/0187289 A1 | 7/2014 | Cataldo et al. |
| 2014/0355200 A1 | 12/2014 | Thiers |
| 2015/0083615 A1 | 3/2015 | Lay et al. |
| 2015/0163938 A1 | 6/2015 | Vroom et al. |
| 2015/0171649 A1 | 6/2015 | Kim et al. |
| 2015/0201723 A1 | 7/2015 | Rayner et al. |
| 2015/0380139 A1 | 12/2015 | Hsu |
| 2016/0040825 A1 | 2/2016 | Franklin |
| 2016/0058145 A1 | 3/2016 | Whitten |
| 2016/0115978 A1 | 4/2016 | Buchanan |
| 2016/0128210 A1 | 5/2016 | Lee |
| 2016/0150861 A1 | 6/2016 | Yao |
| 2016/0254693 A1* | 9/2016 | Moon .................. G06F 1/1632 |
| | | 320/108 |
| 2016/0259374 A1* | 9/2016 | Breiwa ................ H01F 7/0247 |
| 2016/0282907 A1 | 9/2016 | Barnett et al. |
| 2016/0347257 A1 | 12/2016 | Buchanan |
| 2016/0373152 A1 | 12/2016 | Schmidt |
| 2017/0155418 A1 | 6/2017 | Kim |
| 2018/0173275 A1 | 6/2018 | Barnett et al. |
| 2018/0184773 A1 | 7/2018 | Whitten |
| 2019/0009850 A1 | 1/2019 | Peters |
| 2019/0111855 A1 | 4/2019 | Aloe et al. |
| 2019/0198212 A1 | 6/2019 | Levy |
| 2019/0243421 A1 | 8/2019 | Barnett et al. |
| 2020/0150721 A1 | 5/2020 | Barnett et al. |
| 2020/0176928 A1 | 6/2020 | Sutherland et al. |
| 2020/0345115 A1 | 11/2020 | Cantoli-Alves et al. |
| 2020/0400267 A1 | 12/2020 | Garza |
| 2021/0041057 A1 | 2/2021 | Jankura et al. |
| 2021/0046885 A1* | 2/2021 | Jankura ..................... F16B 2/04 |
| 2021/0083491 A1 | 3/2021 | Stanimirovic et al. |
| 2021/0099027 A1 | 4/2021 | Larsson et al. |
| 2021/0099028 A1 | 4/2021 | Thompson et al. |
| 2021/0109569 A1 | 4/2021 | Barnett et al. |
| 2021/0124395 A1 | 4/2021 | Barnett et al. |
| 2021/0242697 A1 | 8/2021 | Stanimirovic et al. |
| 2021/0249880 A1* | 8/2021 | Taylor ....................... H02J 7/02 |
| 2021/0408826 A1 | 12/2021 | Liu et al. |
| 2022/0045398 A1 | 2/2022 | Havskjold et al. |
| 2022/0045527 A1 | 2/2022 | Karanikos et al. |
| 2022/0094382 A1 | 3/2022 | Cole et al. |
| 2022/0096923 A1 | 3/2022 | O'Leary et al. |
| 2022/0103667 A1 | 3/2022 | Chiang et al. |
| 2022/0117098 A1 | 4/2022 | Kalyanasundaram et al. |
| 2022/0137491 A1 | 5/2022 | Stankie et al. |
| 2022/0158678 A1 | 5/2022 | Sirichai et al. |
| 2022/0166868 A1 | 5/2022 | Whitten et al. |
| 2022/0206532 A1 | 6/2022 | Barnett et al. |
| 2022/0311274 A1 | 9/2022 | George |
| 2022/0311286 A1 | 9/2022 | Schwartz |

FOREIGN PATENT DOCUMENTS

| | | |
|---|---|---|
| CN | 203313551 U | 11/2013 |
| DE | 3445832 A1 | 6/1986 |
| DE | 9301423 U1 | 7/1993 |
| DE | 29717382 U1 | 2/1998 |
| DE | 102009039557 | 3/2011 |
| DE | 102010006286 | 8/2011 |
| DE | 102013213760 | 1/2015 |
| DE | 102008013214 B | 2/2025 |
| EP | 0496216 | 3/1996 |
| EP | 1950094 B | 9/2012 |
| EP | 2696510 | 2/2014 |
| EP | 2869473 A | 5/2015 |
| EP | 2529281 B | 7/2015 |
| FR | 2840751 A1 | 12/2003 |
| GB | 2241132 A | 8/1991 |
| GB | 2421017 A | 6/2006 |
| JP | S5516688 U | 2/1980 |
| JP | S06-21350 | 1/1987 |
| JP | H07-288570 | 10/1995 |
| JP | 2004158796 | 6/2004 |
| JP | 2006234896 | 9/2006 |
| JP | 2007334258 | 12/2007 |
| JP | 2011097770 A | 5/2011 |
| KR | 19990036204 U | 9/1999 |
| KR | 100381405 B | 4/2003 |
| KR | 100402916 B | 10/2003 |
| KR | 200396216 Y | 9/2005 |
| KR | 20090007014 U | 7/2009 |
| KR | 20100129880 A | 12/2010 |
| KR | 101062570 | 9/2011 |
| KR | 101072949 B | 10/2011 |
| KR | 101116159 B | 3/2012 |
| KR | 101162552 B | 7/2012 |
| WO | 1999049584 | 9/1999 |
| WO | WO 2000/002362 | 1/2000 |
| WO | WO 2005/056340 | 6/2005 |
| WO | WO 2011/141031 | 11/2011 |
| WO | 2012016158 | 2/2012 |
| WO | 2014107157 | 7/2014 |

OTHER PUBLICATIONS

Ghostek, "Detachable Wallet—Pixel 7," accessed on the Internet at: https://ghostek.com/collections/exec/products/exec-pixel7 (believed to be publicly available before Jun. 28, 2022).

Rokform, "Rugged Case—iPhone 13 Pro Max—Magnetic Mounting," accessed on the Internet at: https://www.rokform.com/products/rugged-case-iphone-13-pro-max (publicly available at least by Dec. 10, 2021).

Rokform, "Rugged Case—iPhone 13 Pro Max—Mag® Safe Compatible," accessed on the Internet at: https://www.rokform.com/products/rugged-case-iphone-13-pro-max (publicly available at least by Dec. 10, 2021).

Wallee M, "Modular Magnetic Phone Mounting System by StudioProper—Kickstarter," access on the Internet at: https://web.archive.org/web/20131117085948/htt9://www.kickstarter.com (Nov. 17, 2013).

Search Report & Written Opinion issued in PCT/IB2022/062249 (Jan. 30, 2023).

Search Regort & Written Oginion issued in PCT/IB2022/062252 (Jan. 31, 2023).

Garmin, "Garmin Forerunner 310 XT: quick release instructions" pp. 1-60, May 2009.

(56) References Cited

OTHER PUBLICATIONS

"Accessory Design Guidelines for Apple Devices" 2020, Apple, Inc., pp. 1-284, https://web.archive.org/web/20201027114221 /https:/developer.applecom/accessories/Accessory-Desiqn-Guidelinespdf.

Brownlee, Marques, "iPhone 12 Unboxing Experience + MagSafe Demo!", Youtube, Oct. 20, 2020, https://www.youtube.com/watch?v=Sx6dAx7dnXG.

MobileReviewsEh, "I Took Apart My $60 MagSafe Case. What Did I Find?" Youtube, Oct. 21, 2020, httgs://www.youtube.com/watch?v=Hj6Gen7L4yA.

Apple, Apple Event—Oct. 13, Youtube, Oct. 13, 2020, https://www.youtube.com/watch?v=KR0g-1hnQPA.

\* cited by examiner

WIRELESS CHARGER MOUNTING SYSTEM

CROSS REFERENCE TO RELATED APPLICATION

This application claims the benefit of priority under 35 U.S.C. § 119(e) to U.S. Provisional Patent Application No. 63/290,799, filed Dec. 17, 2021. The disclosure set forth in the referenced application is incorporated herein by reference in its entirety.

The present disclosure relates generally to a mounting system for mounting a wireless cellphone charger to a cellphone case.

BACKGROUND AND SUMMARY

The present disclosure is directed to a system for mounting a wireless cellphone charger to a cellphone case for charging a cellphone when the cellphone is secured to the cellphone case. The system includes a cellphone case and a wireless cellphone charger mount. The cellphone case defines a bore and a recess disposed adjacent the bore and includes a shell and a first retention ring having a first metal plate receivable by the recess to secure the first retention ring to the shell. The wireless cellphone charger mount has a wireless cellphone charger, a second metal plate and an interface comprising a protrusion receivable by the bore. The wireless cellphone charger is securable to the cellphone case when the first retention ring is secured to the shell by aligning the protrusion and the bore and magnetically coupling the first and second metal plates. At least one of the first and second metal plates is a magnet. The other of the first and second metal plates may be a magnet or may include another metal that is attracted to the magnet of said one of the first and second metal plates.

The recess and the first and second metal plates may be circular and the recess may be disposed about the bore. The bore may include a central bore and at least one lateral slot contiguous with the central bore, and the protrusion may have at least one lateral tab received by the slot when the protrusion is received by the bore. There may, for example, be four lateral slots contiguous with the central bore and spaced 90 degrees apart, and the protrusion may have four lateral tabs spaced 90 degrees apart and received by the slots when the protrusion is received by the bore. The shell may have a rim configured to engage a cellphone and a base having a bottom defining the bore and recess. The mounting system may also include a pick and the shell may include a top defining at least one hole. The hole may be accessible by the pick from the top for separating the first retention ring from the cellphone case when the first retention ring is secured to the cellphone case.

The mounting system may also include at least one alternate first retention ring having an alternate first metal plate. The at least one alternate first retention ring is receivable by the recess and securable to the cellphone case as an alternate to the first retention ring. The color of the retention ring may be different than the color of the alternate retention ring.

In accordance with some embodiments, the cellphone case may be engageable with cellphone accessory mount products. In accordance with some embodiments, the first and second metal plates may be compatible with the magnetic technology known as MAGSAFE Apple Computer, Inc. ("Apple") developed for magnetically securing or otherwise mounting iPhone products to accessory products.

These and other features of the present disclosure will be best understood from the following drawings and detailed description.

BRIEF DESCRIPTION OF THE DRAWINGS

The various features and benefits of the present disclosure will become apparent to those skilled in the art from the following detailed description of the illustrated embodiments. The drawings that accompany the detailed description can be briefly described as follows:

FIG. 1(*b*) is a perspective of the other side of the mounting system of FIG. 1(*a*);

FIG. 2(*b*) is an exploded perspective of the other side of the cellphone case of the mounting system of FIGS. 1(*a*) and 1(*b*);

FIG. 3(*b*) is an exploded perspective of the other side of the wireless charger mount of the mounting system of FIGS. 1(*a*) and 1(*b*);

Figure 1A:
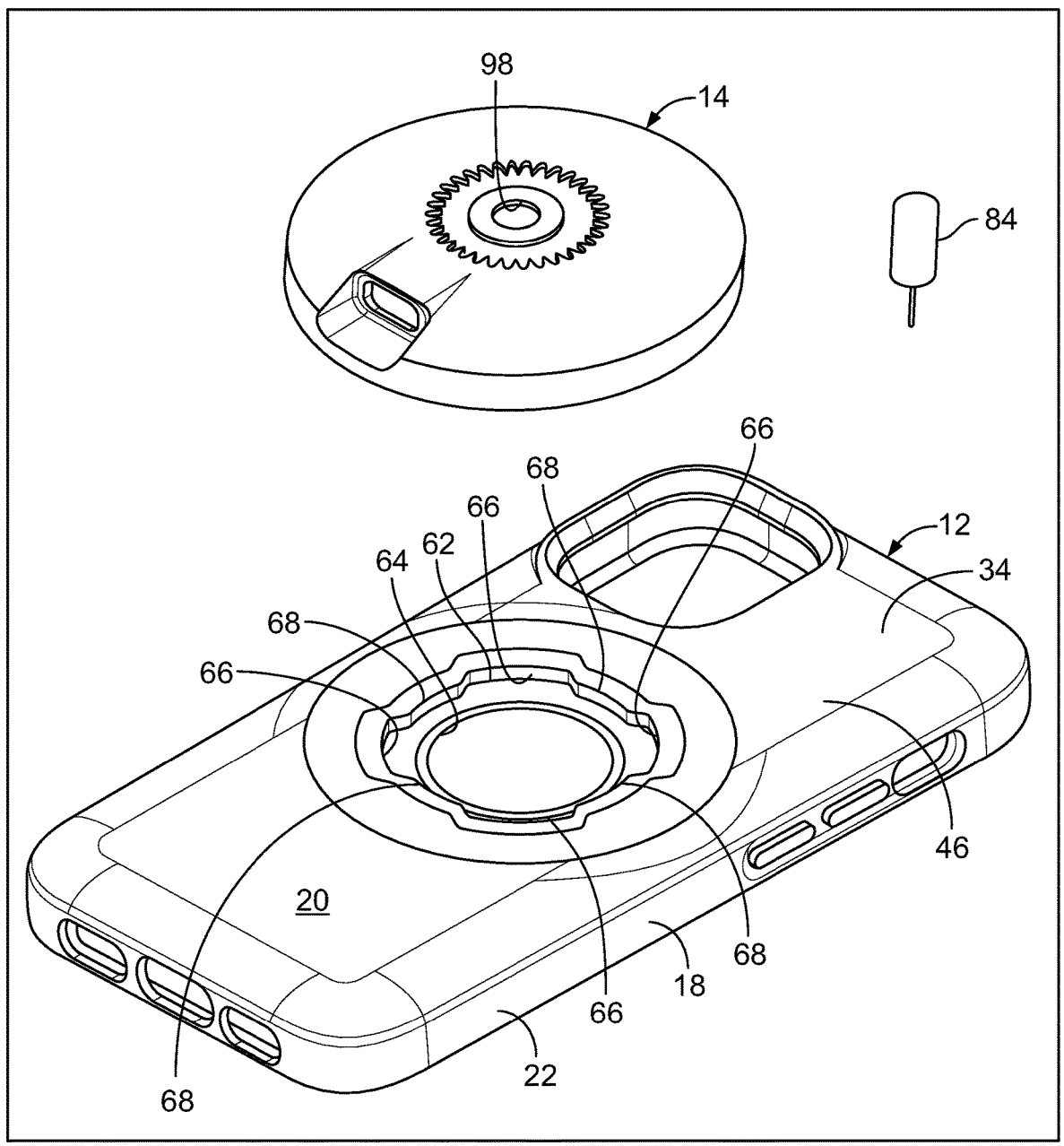
FIG. 1(*a*) is a perspective of one side of a mounting system in accordance with an illustrated embodiment including a wireless charger mount and a cellphone case.
Figure 1B:
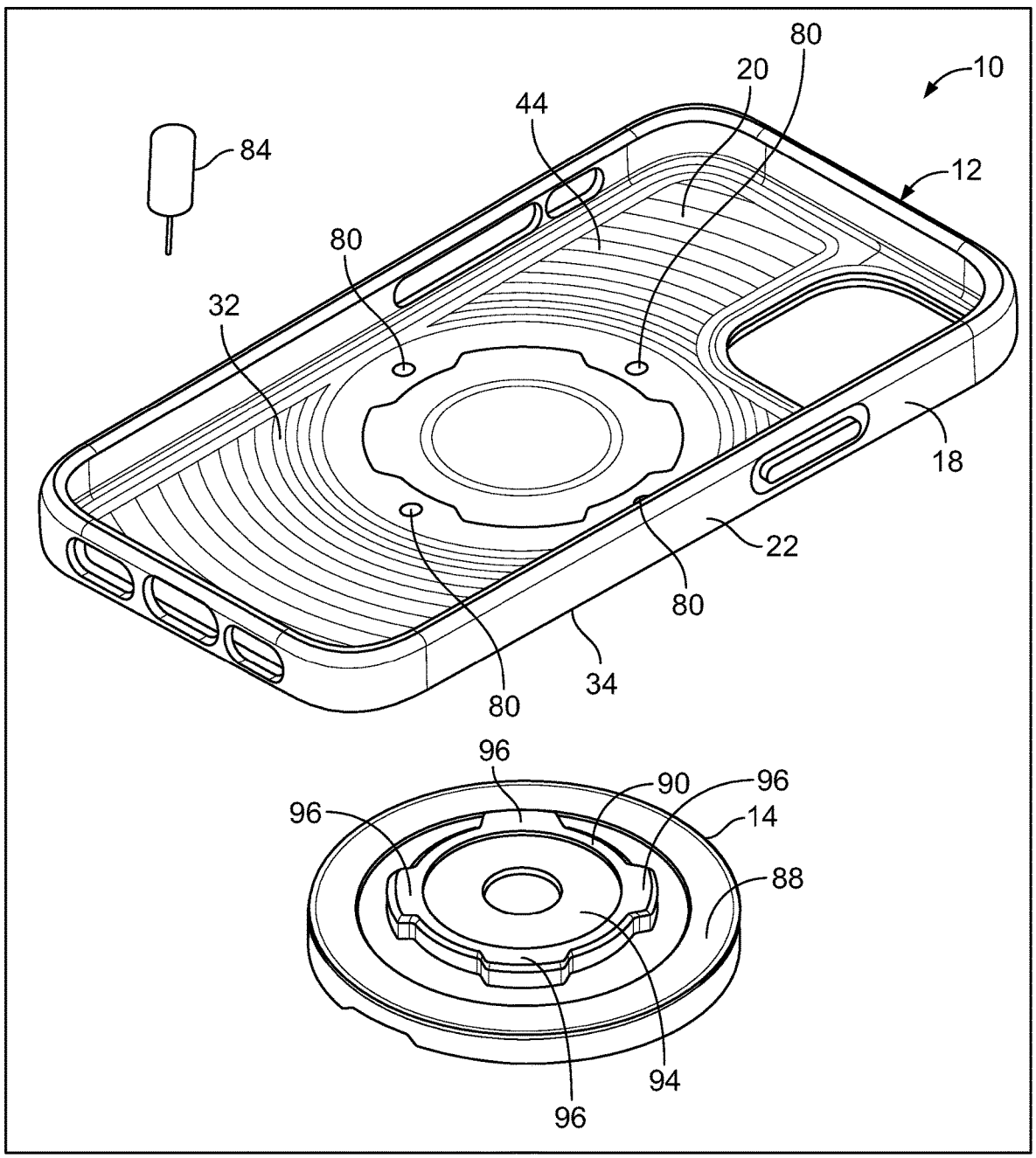
Figure 2A:
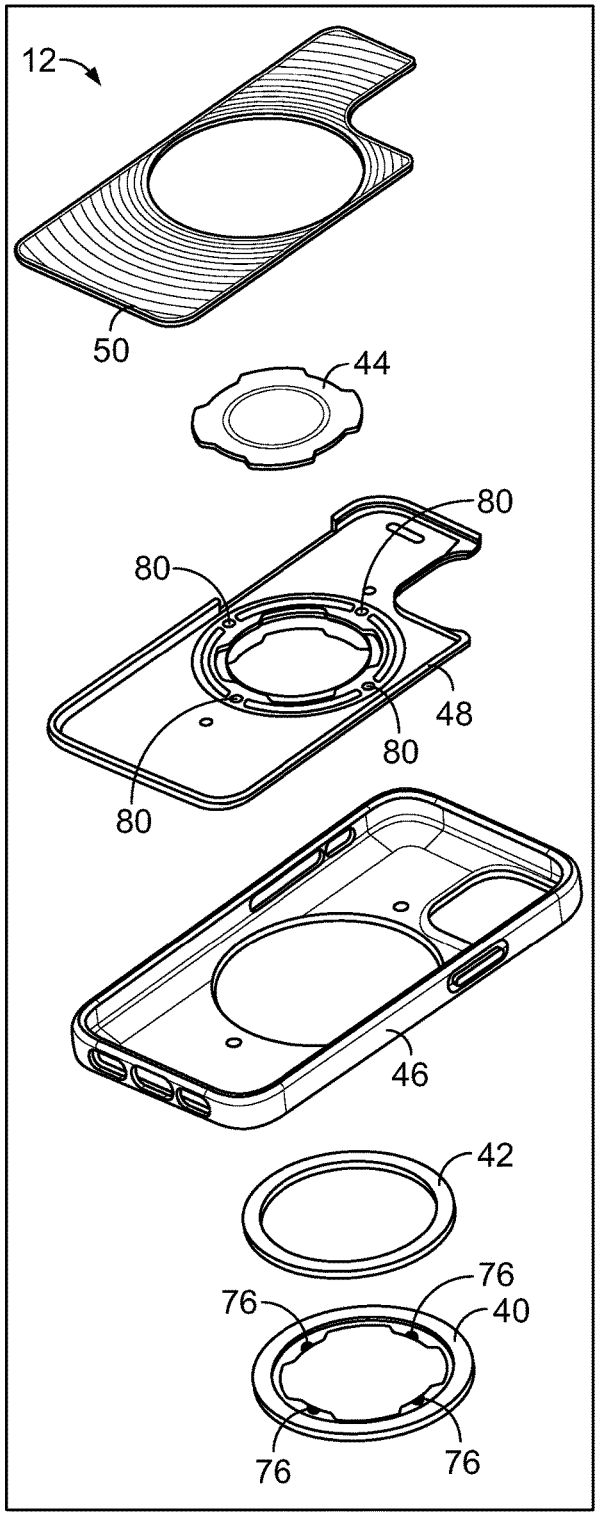
FIG. 2(*a*) is an exploded perspective of one side of the cellphone case of the mounting system of FIGS. 1(*a*) and 1(*b*)
Figure 2B:
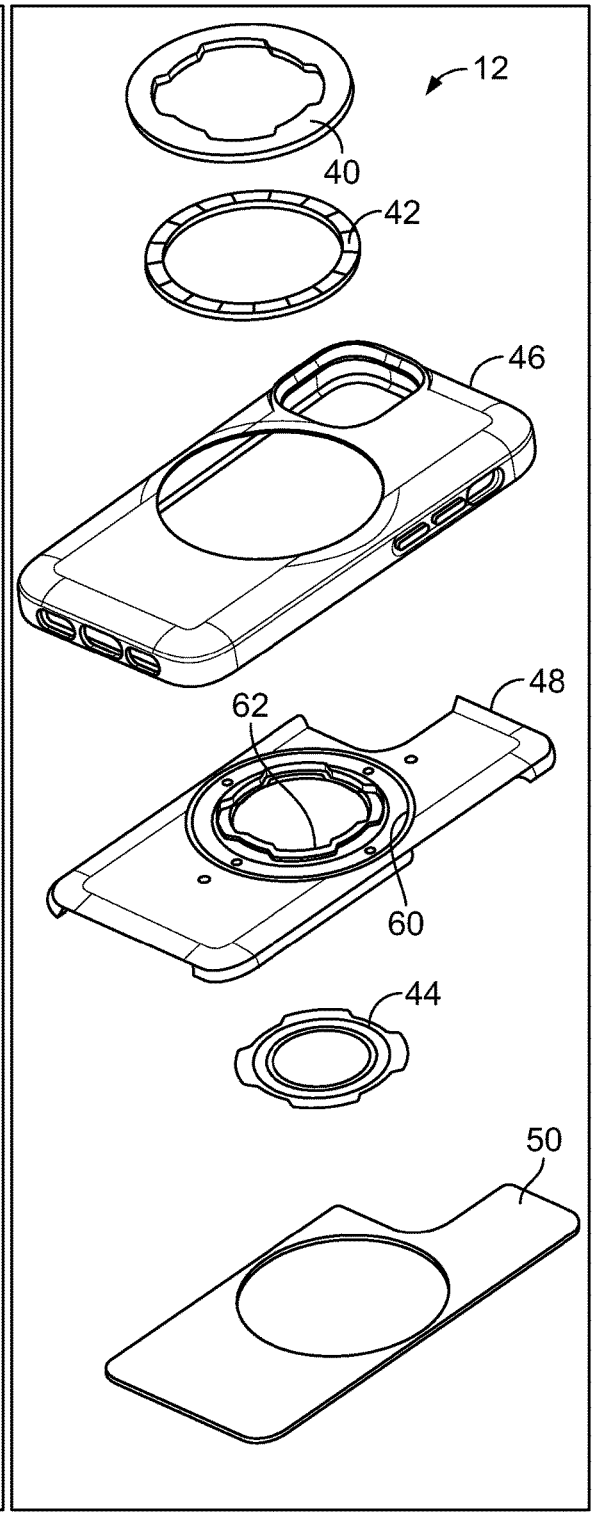
Figure 3A:
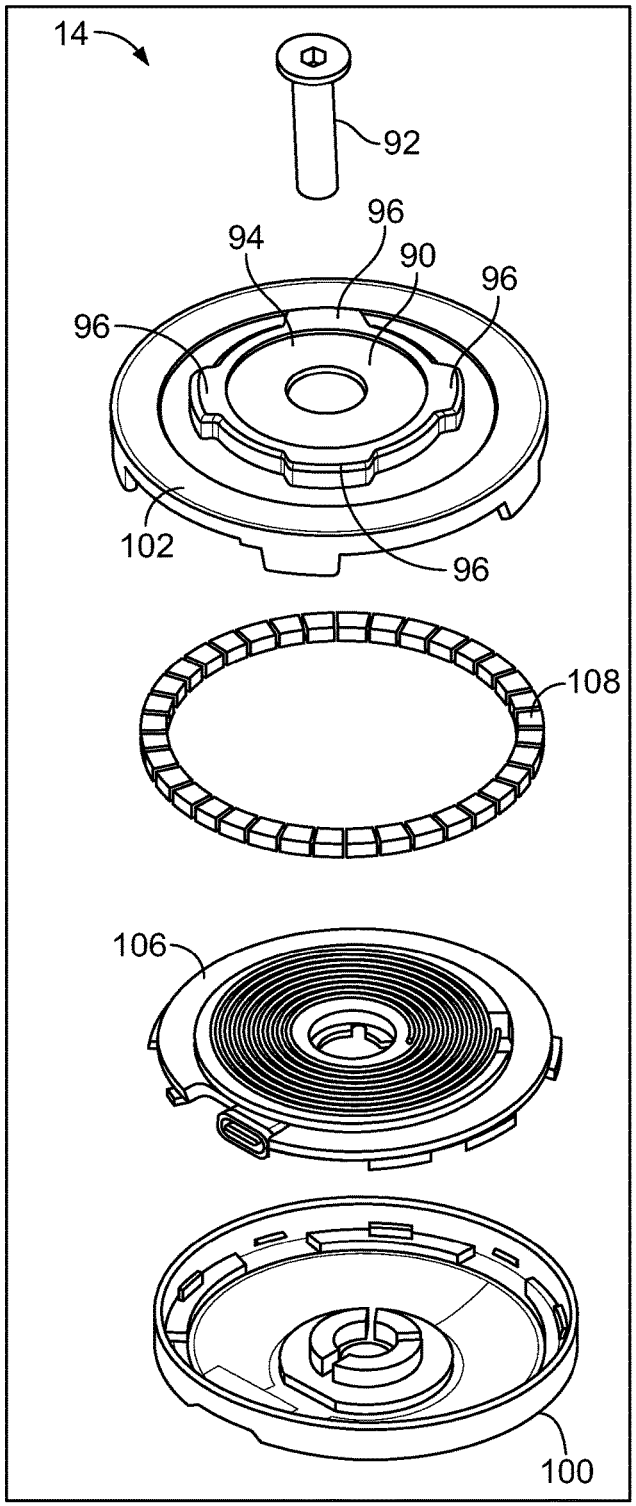
FIG. 3(*a*) is an exploded perspective of one side of the wireless charger mount of the mounting system of FIGS. 1(*a*) and 1(*b*)
Figure 3B:
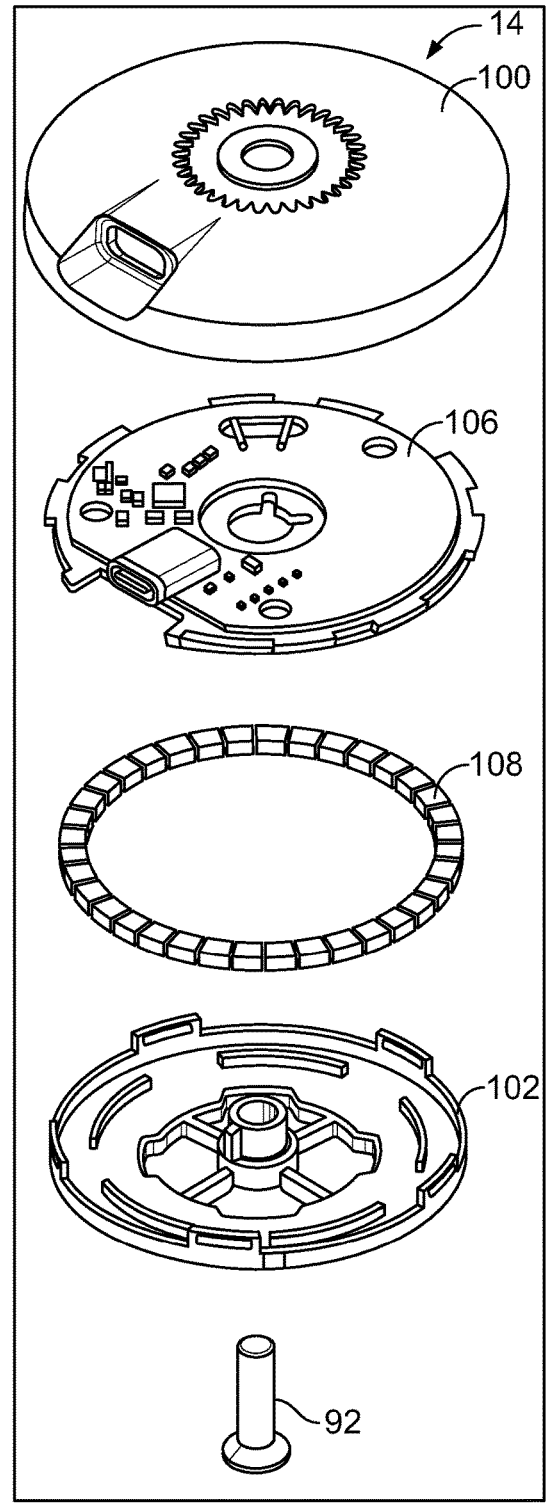
Figure 4:
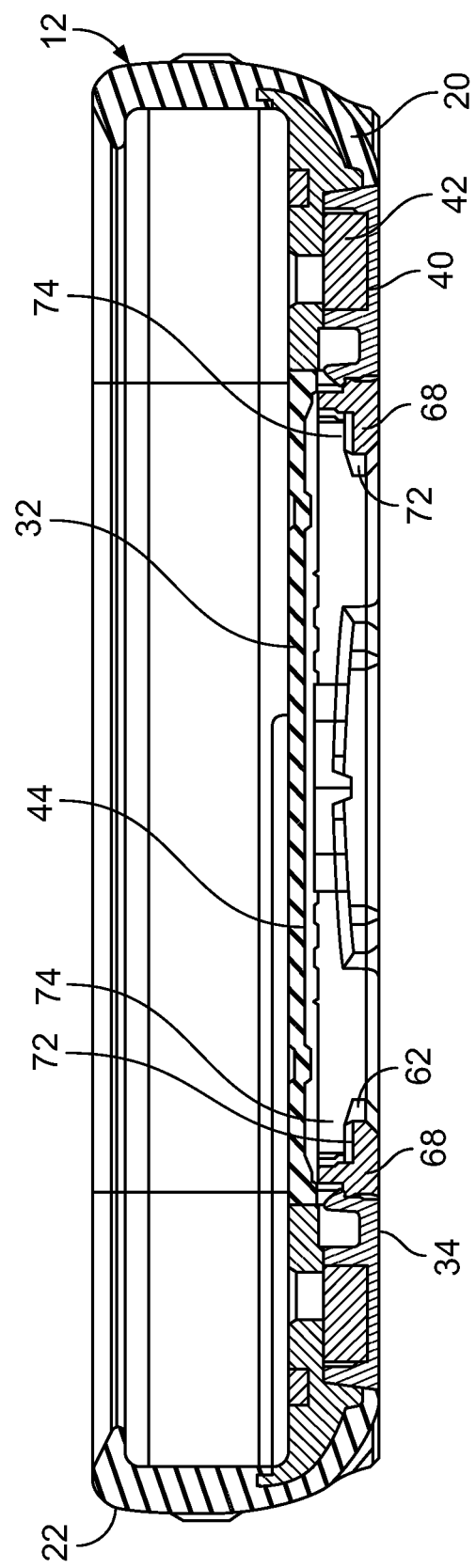
FIG. 4 is a cross section taken along the center of the cellphone case of the mounting system of FIGS. 1(*a*) and 1(*b*)
Figure 5:
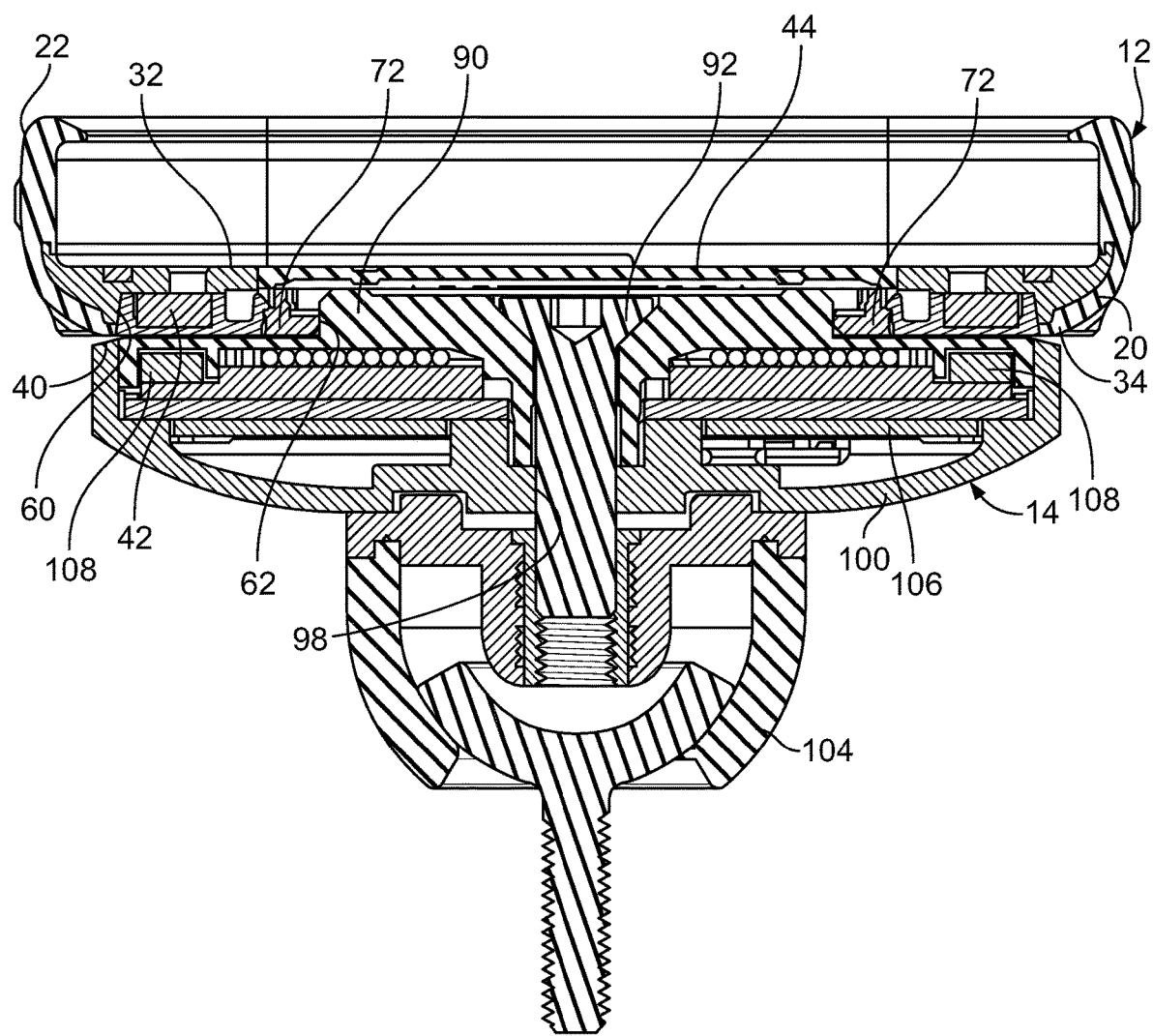
FIG. 5 is a cross section of the mounting system of FIGS. 1(*a*) and 1(*b*) with the cellphone case mounted to the wireless charger mount and a cellphone mount accessory secured thereto.

Other aspects and advantages of the present disclosure will become apparent upon consideration of the following detailed description.

DETAILED DESCRIPTION

While the present disclosure may be embodied in many different forms, several specific embodiments are discussed herein with the understanding that the present disclosure is to be considered only as an exemplification of the principles of the disclosure, and it is not intended to limit the disclosure to the embodiments illustrated.

FIGS. 1-5 illustrate a mounting system 10 including a cellphone case 12 and a wireless cellphone charger mount 14 for charging a cellphone when the wireless charger mount and cellphone are secured to the cellphone case. In accordance with illustrated embodiments, and as described below, the cellphone case 12 can be mounted to other cellphone accessory mount products when the wireless charger mount 14 is separated from the cellphone case 12. The cellphone may be an iPhone or any other handheld cellphone. The mounting system 10 can be used, for example, with Apple's magnetic technology for iPhone products known as MAGSAFE in accordance with an embodiment of the present disclosure.

The cellphone case 12 case includes a shell 18 having a base 20 and a rim 22 for engaging the cell phone. The base 20 includes a top 32 and a bottom 34. The cellphone case 14 further includes several components secured together, including a retention ring 40, a metal plate 42 secured to the retention ring, an internal plate 44 and three casing members including an outer casing member 46, an inner casing member 48 and an internal lining 50. The base 20 includes the casing members 46, 48 and 50. The metal plate 42 is circular and may be in the form of a magnet or a metal plate that includes another metal that is attracted to a magnet. The bottom 34 defines a recess 60 for receiving the retention ring 40 and a bore 62 for engaging the wireless charger mount 14. The recess 60 is circular and is disposed about or otherwise surrounds the bore 62. The bore 62 includes a central bore 64 and four lateral slots 66 contiguous with the central bore 64 spaced 90 degrees apart. Four case tabs 68 spaced 90 degrees apart are disposed between the lateral slots 66 and form notches 72 defining gaps 74. The gaps 74 are also contiguous with the central bore 64 and lateral slots 66. The metal plate 42 may be in the form of a circular magnetic array that is compatible with Apple's MAGSAFE technology. The recess 60 and bore 62 may have any other suitable configuration and the recess may be adjacent the bore in any other suitable manner in accordance with other embodiments of the present disclosure.

The retention ring 40 includes clips 76. The retention ring 40 is snapped into the recess 60 of the cellphone case 12 and retained therein by the clips 76. The illustrated embodiment of the cellphone case 12 defines four holes 80 contiguous with the recess 60, 62 and the mounting system 10 further includes a pick 84. The pick 84 can access any of the holes 80 from the top 32 of the base 20 for dislodging and removing the retention ring 40 from the recess 60 of the cellphone case 12. The pick 84 may have any suitable construction.

The mounting system 10 may include a plurality of the retention rings 40 so that the user a choice of retention rings and can change the appearance of the cellphone case 12. For example, each of the plurality of the retention rings 40 may be of a color different than the colors of the or more other retention rings so that the user can select to secure to the cellphone case 12 a retention ring of a desired color.

The internal plate 44 may be ultrasonically welded to the inner casing member 48. This construction may eliminate openings and allow for the internal plate 44 to be reduced in thickness without comprising strength. The reduction in thickness or depth of the cellphone case allows the phone to efficiently wirelessly charge using an Apple MAGSAGE wireless charger or other suitable wireless charger.

The wireless interface of the wireless charger mount 14 further includes a mount base 88 and a protrusion 90 extending from the mount base substantially parallel to a longitudinal axis of the mount base. The protrusion 90 has a central portion 94 and four lateral tabs 96 spaced 90° apart. The wireless charger mount 14 includes a fastener 92 received by hole 98 defined by the wireless charger mount for engaging a cellphone accessory product 104 (see, e.g., FIG. 5). The illustrated wireless charger mount 14 further includes a casing 100, a base 102, a wireless charger 106 and a metal plate 108 housed within the casing. The metal plate 108 may be in the form of a magnet or a metal plate that includes a metal that is attracted to a magnet. The metal plate 108 may be in the form of a circular magnet array that corresponds with the metal plate 42 of the cellphone case 12 to attract the cellphone case 12 to the wireless charger mount 14. The metal plate 108 may have any other suitable configuration in accordance with other embodiments of the present disclosure. The metal plate 108 may also be compatible with Apple's MAGSAFE technology.

The wireless charger mount 14 may be powered by any suitable power source (not shown) including any suitable cable connected to the wireless charger mount 14 in any suitable manner for providing power to the transmitting coil 20. The cellphone case 12 and the casing 100 and the base 102 may be constructed of any suitable plastic or any other suitable material and may have any other suitable configuration in accordance with other embodiments of the present disclosure.

The illustrated mounting system 10 may also be characterized as having two slots 66 extending laterally from the central bore 64 and spaced 180 degrees apart, and the protrusion 90 of the wireless charger mount 14 as having two lateral tabs 96 spaced 180 degrees apart. In this regard, the mounting system in accordance with embodiments of the present disclosure, the bore may have more or less than two slots and the protrusion may have more or less than four lateral tabs.

During securement of the cellphone case 12 to the wireless charger mount 14, the protrusion 90 of the wireless charger mount 14 is aligned with the bore 62, including aligning the lateral tabs 96 and the lateral slots 66. The metal plates 42 and 108 are then magnetically coupled together with the bore 62 receiving the protrusion 90 and the slots 66 receiving the lateral tabs 96. Metal plates 42 and 108 may both be magnets or one of the metal plates 42 and 108 can be a magnet and the other metal plate can a metal that is attracted to said one of the metal plates 42 and 108. The metal plates 42 and 108 are illustrated as being circular but they may have any other configuration in accordance with other embodiments of the present disclosure. The mechanical alignment along with the magnetic attraction provides more robust alignment and shear strength than common flat magnetic mounts. Once mounted, because the lateral tabs 96 extend from the mount base 88 substantially parallel to the longitudinal axis of the mount base 88, the cellphone case 12 in accordance with the illustrated embodiment cannot be rotated relative to the wireless charger mount 14 unless it is separated from the wireless charger mount. The wireless charger 106 functions to charge the cellphone. The wireless charger mount 14 can be readily unsecured from the cellphone case 12 by applying a force greater than the magnetic force of the metal plates 42 and 108.

Figure 6:
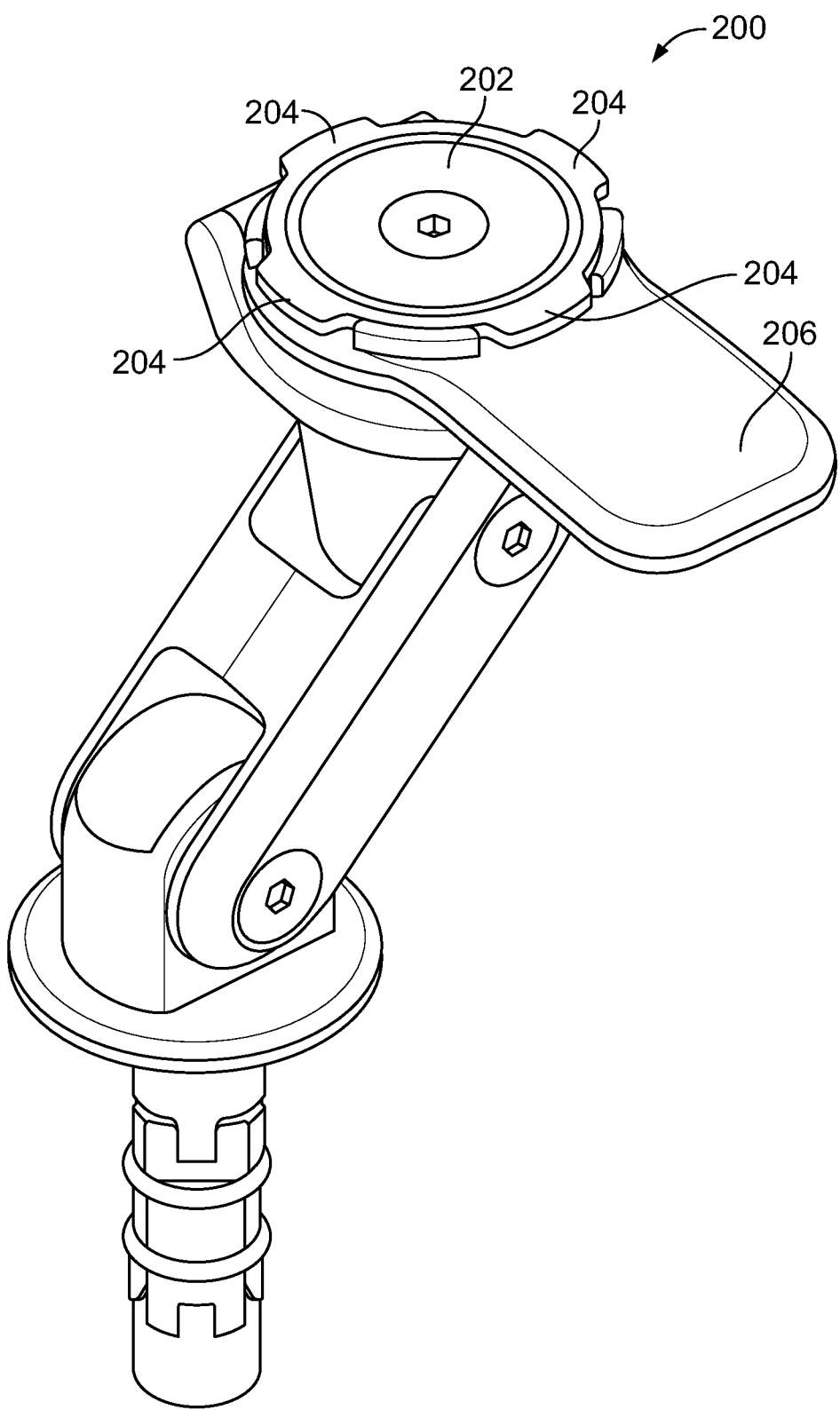
FIG. 6 is an example of a commercially-available cellphone accessory mount that can be secured to the cellphone case of the mounting system of FIGS. 1(*a*) and 1(*b*) when the wireless charger mount is separated from the cellphone case.

The interface on the bottom 34 of the cellphone case 12 may complement the interface of one or more cellphone accessory mount products so that the cellphone case may also be secured to other cellphone accessory mount products when the wireless charger mount 14 is removed is not secured to the cellphone case. Examples of such cellphone accessory mount products are disclosed, for example, in U.S. Pat. Nos. 11,303,143, D941,760, D940,125, D883,922, 10,649,492, D876,316, 10,569,717, D873,812, D870,719, D870,718, D865,252, D852,681, 9,243,739. As a further example, FIG. 6, illustrates a commercially-available cellphone accessory mount product 200 having an interface comprising a protrusion 202 having four lateral tabs 204 spaced 90 degrees apart and a lever 206 configured to be received by the bore 62 when the wireless charger mount 14 is not secured to the cellphone case and when the lever is pressed to define gaps beneath the lateral tabs. The interface of the accessory product is received by the bore 62 and, upon rotation of 90 degrees (or 90 degree increments), the tabs 204 are received within the gaps 74 of the cellphone case 12 and engage the bottom of the notches 72 to engage the accessory 200 to the cellphone case 12.

Accordingly, the present disclosure provides several benefits. For example, it provides an efficient manner of securing a wireless charger mount to a cellphone case to wirelessly charge a cellphone secured to the cellphone case. Further, if desired, the cellphone case 12 can be secured to other cellphone accessory mount products when the wireless charger mount 14 is secured to the cellphone case (see, e.g., FIG. 6). Still further, because of the interface of the cellphone case 12, the cellphone case can be secured to other cellphone accessory mount products such as the accessory products shown in FIG. 6 and U.S. Pat. Nos. 11,303,143, D941,760, D940,125, D883,922, 10,649,492, D876,316, 10,569,717, D873,812, D870,719, D870,718, D865,252, D852,681, 9,243,739.

In accordance with other embodiments of the present disclosure, the magnetic system can be used as a magnetic mount without a wireless charger.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications, which come within the scope of the appended claims, are reserved.

What is claimed is:

1. A mounting system for mounting a wireless cellphone charger to a cellphone case for charging a cellphone is secured to the cellphone case, the mounting system comprising:
    a cellphone case defining a bore and a recess disposed adjacent the bore and including a shell and a retention ring having a first metal plate receivable by the recess to secure the retention ring to the shell; and
    a wireless cellphone charger mount having a wireless cellphone charger, a second metal plate, and an interface comprising a protrusion receivable by the bore to secure the wireless cellphone charger to the cellphone case, the wireless cellphone charger securable to the cellphone case when the retention ring is secured to the shell by aligning the protrusion and the bore and magnetically coupling the first and second metal plates;
    wherein at least one of the first and second metal plates is a magnet and the other of the first and second metal plates is magnetically attracted to the magnet
    wherein the bore includes a central bore and four lateral slots contiguous with the central bore and spaced 90 degrees apart, and the protrusion has four lateral tabs spaced 90 degrees apart and received by the slots when the protrusion is received by the bore, and
    wherein the recess, the central bore, and the first and second metal plates are circular, and the recess is disposed about the bore.

2. The mounting system of claim 1, wherein the retention ring is circular.

3. The mounting system of claim 1, wherein the shell has a rim configured to engage a cellphone and a base having a bottom defining the bore and recess.

4. The mounting system of claim 3, further comprising a pick and wherein the base has a top and defines at least one hole contiguous with the recess accessible from the top by the pick for separating the retention ring from the cellphone case.

5. The mounting system of claim 1, wherein the cellphone case further comprises four case tabs spaced 90 degrees apart and disposed between the lateral slots, wherein the case tabs form notches defining gaps configured to receive mount tabs of a cellphone mounting accessory receivable in the slots and receivable by the gaps during rotation of the cellphone mounting accessory relative to the cellphone case to engage the cellphone case and the cellphone mounting accessory.

6. The mounting system of claim 1, further comprising at least one alternate retention ring having an alternate first metal plate, the at least one alternate retention ring receivable by the recess and securable to the cellphone case as an alternative to the retention ring.

7. The mounting system of claim 1, wherein the wireless cellphone charger mount further comprises a fastener for engaging a cellphone accessory mount product.

8. The mounting system of claim 6, wherein the at least one alternate retention ring has a color that is different from a color of the retention ring.

9. A mounting system for mounting a wireless cellphone charger to a cellphone case for charging a cellphone secured to the cellphone case, the mounting system comprising:
    a cellphone case defining a central bore, four lateral slots contiguous with the central bore spaced apart 90 degrees, and a circular recess disposed about the central bore and the slots, the cellphone case including a shell and at least two circular retention rings each having a first circular metal plate receivable by the recess and securable to the cellphone case; and
    a wireless cellphone charger mount having a wireless cellphone charger, a second metal plate, and an interface comprising a protrusion having four lateral tabs spaced apart 90 degrees receivable by the lateral slots when the wireless cellphone charger is secured to the cellphone case, the wireless cellphone charger securable to the cellphone case when one of the retention rings is secured to the shell by aligning the lateral tabs and the lateral slots and magnetically coupling the first and second metal plates;
    wherein at least one of the first and second metal plates is a magnet and the other of the first and second metal plates is magnetically attracted to the magnet.

10. The mounting system of claim 9, wherein the cellphone case further comprises four case tabs separating the slots, wherein the case tabs form notches defining gaps and are configured to engage a cellphone mounting accessory having a plurality of mount tabs receivable in the slots and receivable by the gaps during rotation of the mounting accessory mounting accessory relative to the cellphone case to engage the cellphone case and the cellphone mounting accessory.

11. The mounting system of claim 9, further comprising a pick and wherein the shell has a rim configured to engage a cellphone and a base having a bottom defining the bore and recess and wherein the shell includes a top and defines at least one hole contiguous with the recess accessible from the top by the pick for separating said one of the retention rings from the cellphone case to be exchanged with the other of the retention rings into the recess.

12. The mounting system of claim 9, wherein said one of the retention rings has a color that is different from a color of an other retention ring.

13. A mounting system for mounting a wireless cellphone charger to a cellphone case for charging a cellphone secured to the cellphone case, the mounting system comprising:
    a cellphone case including a shell and a circular retention ring having a first circular metal plate, the cellphone case defining a central bore, four lateral slots contiguous with the central bore spaced apart 90 degrees, four case tabs separating the slots, and a circular recess disposed about the central bore and the slots, the retention ring and first metal plate being received by the recess and the retention ring being secured to the cellphone case to hold the first metal plate on the cellphone case; and a wireless cellphone charger mount having a wireless cellphone charger, a second metal plate, and an interface comprising a protrusion having four lateral tabs spaced apart 90 degrees receivable by the lateral slots when the wireless cellphone charger is secured to the cellphone case, the wireless cellphone charger securable to the cellphone case by aligning the lateral tabs and the lateral slots and magnetically coupling the first and second metal plates;

wherein at least one of the first and second metal plates is a magnet and the other of the first and second metal plates is magnetically attracted to the magnet, and wherein the case tabs form notches defining gaps and are configured to engage a cellphone mounting accessory having a plurality of mount tabs receivable in the slots and receivable by the gaps during rotation of the cellphone mounting accessory mounting accessory relative to the cellphone case to engage the cellphone case and the cellphone mounting accessory.

14. The mounting system of claim 13, wherein the shell has a rim configured to engage the cellphone and a base having a bottom defining the bore and recess.

15. The mounting system of claim 14, further comprising at least one alternate retention ring having an alternate first metal plate, the at least one alternate retention ring receivable by the recess and securable to the cellphone case as an alternative to the retention ring.

16. The mounting system of claim 15, further comprising a pick and wherein the base has a top and defines at least one hole contiguous with the recess accessible from the top by the pick for separating the retention ring from the cellphone case to be exchanged with the alternate retention rings into the recess.

17. The mounting system of claim 15, wherein the at least one alternate retention ring has a color that is different from a color of the retention ring.

* * * * *